United States Patent [19]

Michel et al.

[11] 4,327,777
[45] May 4, 1982

[54] SUPPORTING SHEATH FOR A LONGITUDINALLY SHIRRED PACKAGING TUBE

[75] Inventors: Wolfgang Michel; Reinhold Becker, both of Wiesbaden, Fed. Rep. of Germany

[73] Assignee: Hoechst Aktiengesellschaft, Frankfurt am Main, Fed. Rep. of Germany

[21] Appl. No.: 154,861

[22] Filed: May 30, 1980

[30] Foreign Application Priority Data

Jun. 8, 1979 [DE] Fed. Rep. of Germany ....... 2923187

[51] Int. Cl.³ .................... F16L 11/08; F16L 11/10
[52] U.S. Cl. ................................. 138/118.1; 138/109
[58] Field of Search .................. 138/109, 118.1; 53/3, 53/441, 442; 29/447; 426/105, 135, 138; 206/497, 802, 804

[56] References Cited

U.S. PATENT DOCUMENTS

| 99,018 | 1/1870 | Smith | 138/109 |
|---|---|---|---|
| 2,150,471 | 3/1939 | Vulpen . | |
| 2,371,508 | 2/1959 | Hill . | |
| 2,933,866 | 4/1960 | Cranston . | |
| 3,148,992 | 9/1964 | Hewitt . | |
| 3,446,634 | 5/1969 | Stahlberger . | |
| 3,528,825 | 9/1970 | Doughty . | |
| 3,639,130 | 2/1972 | Eichin et al. | 138/118.1 |
| 3,864,494 | 2/1975 | Kupcikevicus et al. | 426/105 X |
| 3,942,568 | 3/1976 | Stemmler . | |
| 3,952,370 | 4/1976 | Greider . | |
| 4,007,761 | 2/1977 | Beckman | 138/118.1 X |
| 4,013,099 | 3/1977 | Gerigk et al. | 138/109 |
| 4,033,382 | 7/1977 | Eichin | 138/118.1 |
| 4,064,673 | 12/1977 | Gerigk et al. | 53/3 |
| 4,132,047 | 1/1979 | Gerigk et al. | 138/118.1 |
| 4,245,674 | 1/1981 | Nakamuro et al. | 138/109 |

FOREIGN PATENT DOCUMENTS

| 2551452 | 5/1976 | Fed. Rep. of Germany . |
|---|---|---|
| 2510637 | 9/1976 | Fed. Rep. of Germany . |
| 2511770 | 9/1976 | Fed. Rep. of Germany . |
| 2733996 | 2/1979 | Fed. Rep. of Germany . |
| 2809585 | 9/1979 | Fed. Rep. of Germany . |
| 2291015 | 6/1976 | France . |
| 2303480 | 10/1976 | France . |
| 2001234 | 1/1979 | United Kingdom . |

*Primary Examiner*—James E. Bryant, III
*Attorney, Agent, or Firm*—Schwartz, Jeffery, Schwaab, Mack, Blumenthal & Koch

[57] ABSTRACT

Disclosed is a supporting sheath for a longitudinally shirred packaging tube, comprising a generally tubular shaped supporting sheath comprised of a grid-like structure and having an inside diameter slightly larger than the outside diameter of the shirred packaging tube and a length substantially greater than the length of the shirred packaging tube, so that when a shirred packaging tube is placed inside of the supporting sheath, two protruding ends of the supporting sheath remain; and a pair of generally planar star-like disc elements, each including a central aperture therein and a plurality of point-like projections spaced around its outer circumference, each of the disc elements having an outer diameter defined by the ends of the point-like protrusions which is larger than the inside diameter of the supporting sheath; wherein the star-like disc elements are adapted to be slid over the protruding ends of the supporting sheath and are adapted to engage with their point-like protrusions the grid-openings of the supporting sheath when the sheath ends are folded back 180° upon themselves. Also disclosed are a functional unit comprised of the shirred packaging tube and the supporting sheath as well as a method for producing the functional unit.

7 Claims, 3 Drawing Figures

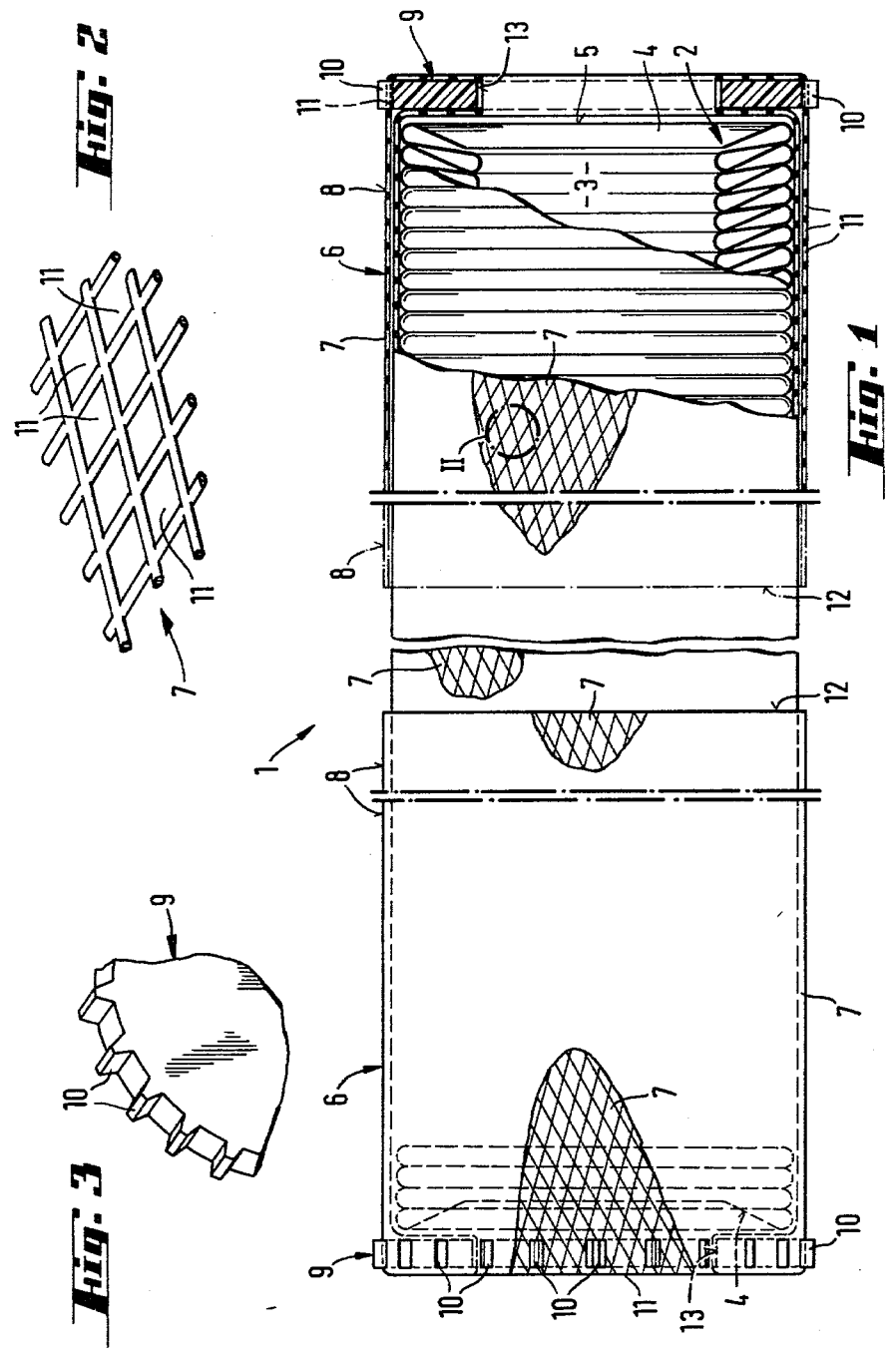

SUPPORTING SHEATH FOR A LONGITUDINALLY SHIRRED PACKAGING TUBE

BACKGROUND OF THE INVENTION

The present invention relates to a functional unit comprising a self-supporting hollow stick or rod made up of a longitudinally shirred packaging tube, preferably a packaging tube based on fiber-reinforced cellulose hydrate, and a supporting container which envelopes the hollow stick leaving the stick cavity openings free. The supporting container is comprised of a single piece of a grid-like structured tubular supporting sheathing made of a plastic material, and star-shaped disc elements which are disposed at the ends of the sheath constituting the supporting container and serve to fix the sheath around the hollow stick.

The invention further relates to a process for the manufacture of the above-mentioned functional unit and to the use thereof in the production of sausages.

Meat preparations in the form of sausage emulsions filled into synthetic tubular casings are put onto the market in great quantities. The artificial sausage casings are composed either of a synthetic material or of cellulose hydrate tubes which are, preferably, fiber-reinforced.

In the production of sausages, tubes of the above-specified kind are used which have a length of, for example, 20 m. By means of conventional apparatus, these tubes are longitudinally gathered and simultaneously folded in a known manner into hollow cylindrical, self-supporting sticks which are open at both ends and are, at the same time or later, compressed in the direction of their longitudinal axis. This is known as shirring. Starting out from a tube length of 20 m, such self-supporting hollow sticks formed by shirring tubes have a length of about 40 cm.

When the packaging tube forming the hollow stick is to be filled with sausage emulsion, it is first closed at one of its ends and then the hollow stick is, with its open end forward, pushed onto the stuffing horn of a sausage filling machine. The sausage emulsion is then continuously and under pressure filled into the hollow stick, which is thereby unfolded according to the amount of sausage emulsion pressed into the tube.

Due to their manufacture, the hollow sticks have a certain dimensional stability or inherent rigidity, but they are sensitive to bending stresses and will easily break into two or more parts which are linked to one another by unfolded integral tube sections. Broken sticks are, however, practically useless.

The great mechanical stress to which the tube forming the hollow stick is subjected in the filling procedure makes it necessary to soak the hollow stick of cellulose hydrate tubing in water, prior to filling. During soaking, the tube absorbs water and swells and there is, therefore, a risk that the hollow stick undergoes a change of length and a reduction of its inherent rigidity. As a result, the stick can often no longer be used for its intended purpose.

There is a particularly great risk that the hollow stick may lose its original shape and dimensions upon handling, due to the above-mentioned influences, if the tubular casing forming the hollow stick has a relatively thick wall, for example, of 0.07 mm and a comparatively large inside diameter, for example, of 40 mm.

U.S. Pat. No. 4,013,099 proposes a method of overcoming the above-mentioned drawback, but this method has the disadvantage that, in the use of the known sheathed hollow stick, the inverted projecting ends of the support sheathing forming the supporting container cannot reliably be prevented from returning, in an undesired way, into their original position. Even an application of additional clamp ring elements which encompass the outsides of the inverted sheath ends does not suffice to hinder the projecting ends of the support sheathing from leaving their inverted position.

SUMMARY OF THE INVENTION

It is, therefore, an object of the present invention to provide an improved supporting sheath for a longitudinally shirred packaging tube.

Another object of the invention resides in providing such an improved supporting sheath, wherein during its application for the intended purpose, it is ensured that the shape and dimensions of the supporting sheath enveloping the hollow stick as well as the arrangement of the sheath around the hollow stick cannot change by themselves, i.e., that the supporting sheath is permanently dimensionally stable.

It is also an object of the invention to provide an improved functional unit comprised of a shirred packaging tube contained inside of the supporting sheath.

It is also an object of the present invention to provide a method for producing the functional unit according to the invention, as well as a method for using the functional unit in a sausage-producing process.

In accomplishing the foregoing objects, there has been provided in accordance with the present invention a supporting sheath for a longitudinally shirred packaging tube, comprising a generally tubular shaped supporting sheath comprised of a grid-like structure and having an inside diameter slightly larger than the outside diameter of the shirred packaging tube and a length substantially greater than the length of the shirred packaging tube, so that when a shirred packaging tube is placed inside of the supporting sheath, two protruding ends of the supporting sheath remain; a pair of generally planar star-like disc elements, each including a central aperture therein and a plurality of point-like projections spaced around its outer circumference, each of the disc elements having an outer diameter defined by the ends of the point-like protrusions which is larger than the inside diameter of the supporting sheath; wherein a first of the star-like disc elements is adapted to be slid with its aperture over one of the protruding ends of the supporting sheath and abutted against a first end of a shirred packaging tube contained therein and is adapted to engage with its point-like protrusions the grid openings of the supporting sheath when the sheath is folded back 180° upon itself; and wherein a second of the star-like disc elements is adapted to be slid with its aperture over the other of the protruding ends of the supporting sheath and abutted against the second end of a shirred packaging tube contained therein and is adapted to engage with its point-like protrusions the grid openings of the supporting sheath when the sheath is folded back 180° upon itself.

In accordance with another aspect of the invention, there has been provided a functional unit comprising a longitudinally shirred packaging tube and a supporting sheath surrounding the shirred packaging tube wherein the supporting sheath is the supporting sheath defined hereinabove.

According to still another aspect of the present invention, there has been provided a method for producing the above-defined functional unit, comprising the steps of placing the shirred packaging tube in a generally tubular shaped supporting sheath comprised of a grid-like structure and having an inside diameter slightly larger than the outside diameter of the shirred packaging tube and a length substantially greater than the length of the shirred packaging tube, so that when the shirred packaging tube is placed inside of the supporting sheath, two protruding ends of the supporting sheath remain; providing a pair of generally planar star-like disc elements, each including a central aperture therein and a plurality of point-like projections spaced around its outer circumference, each of the disc elements having an outer diameter defined by the ends of the point-like protrusions which is larger than the inside diameter of the supporting sheath; sliding a first of the star-like disc elements with its aperture over one of the protruding ends of the supporting sheath and abutting it against a first end of the shirred packaging tube contained in the supporting sheath; sliding a second of the star-like disc elements with its aperture over the other of the protruding ends of the supporting sheath and abutting it against the second end of the shirred packaging tube contained in the supporting sheath; and folding back 180° upon itself each of the protruding ends of the supporting sheath, whereby the point-like protrusions of the disc elements are engaged in the grid openings of the supporting sheath.

Further objects, features and advantages of the present invention shall become apparent from the detailed description of preferred embodiments which follows, when considered together with the attached figures of drawing.

BRIEF DESCRIPTION OF THE DRAWINGS

IN THE DRAWINGS:

FIG. 1 is a plan view, partly broken away, of the functional unit according to the present invention;

FIG. 2 is a perspective isolation view of the grid-like structure used to make the supporting sheath of the present invention; and FIG. 3 is a perspective isolated view of the star-like disc employed according to the invention.

DETAILED DESCRIPTION OF PREFERRED EMBODIMENTS

The functional unit of the invention is constructed of the elements specified below:

(1) A self-supporting hollow stick or rod made up of a longitudinally shirred length of a packaging tube, preferably a packaging tube based on fiber-reinforced cellulose hydrate.

(2) A single piece of grid-like structured tubular sheathing of a particular length, having a uniform circular cross-section. The length of the piece of support sheathing relative to the length of the hollow stick is such that, preferably, equally long integral projecting ends of the supporting sheathing protrude over either end of the hollow stick arranged in the hollow space of the support sheathing. The piece of support sheathing can also be provided with a grid-like structure in its projecting ends only. Each of the integral projecting ends of the support sheathing has a length which at least corresponds to twice the diameter of the support sheathing. The inside diameter of the support sheathing is adapted to the outside diameter of the hollow stick. The support sheathing is advantageously comprised of a plastic material, particularly, of polyvinyl chloride or polyamide, or more preferably, however, of polyethylene or polypropylene.

(3) Two "star discs" which are dimensionally stable and inherently rigid and each of which has a circular opening in its center. The term "star discs" is meant to denote planar bodies which are provided with a star-like serration around their outer circumferences and have planar surfaces extending parallel to one another. The inner circumferential walls of the star discs limit their central circular openings. The star discs of the functional unit are preferably identical in their shape and dimensions. They have at least three points, the points being arranged symmetrically with respect to the centers of the discs. Preferably, the star discs have more than three points, in particular, a great number of points arranged symmetrically with respect to each other, as that they resemble a toothed wheel or gear.

The points of the star discs, in each case, preferably have the same shape and dimensions. Viewed from the top, the tapered ends of the points may be rounded or flattened. The shape and dimensions of the star disc points are adapted to the shape and dimensions of the grid openings in the tubular support sheathing in such a way that the points are capable of positively engaging the grid openings. The star disc points may also have a spiked shape.

In preferred embodiments, the star discs have the feature that their equally long points lie on a common imaginary circular line which limits the outer circumference of the disc and the center of which coincides with the disc center. The diameters of the imaginary circular lines which in each case limit the outer circumference of a star disc are greater than the inside dimensions of the respective grid-like structured tubular support sheathings.

The term "star disc with a central circular opening", according to the definition, shall also include polygonal, e.g., quadratic discs with central circular openings, as well as discs in the form of equilateral triangles with central circular openings.

The star discs are preferably made of plastic, preferably of polyethylene or polypropylene, and most preferably of polyvinyl chloride. The thickness of the star disc is not critical, as long as a sufficient inherent rigidity is ensured.

The diameter of the central circular opening of the star disc is in each case adapted to the diameter of the hollow stick, i.e., the opening is of a smaller diameter than the hollow stick.

Within the functional unit, the star discs functionally interact with the grid-like structured support sheathing, thus producing a permanently dimensionally stable supporting container enveloping the hollow stick. The portion of the supporting container which is in contact with the outer circumference of the hollow stick is called a jacket.

The structural shape of the function unit is obtained in such a way that a shirred hollow stick or rod is arranged in the hollow space of a tubular grid-like structured support sheathing so that, preferably, equally long ends of the support sheathing protrude over the ends of the hollow stick. Then star discs with central circular openings are slid over the projecting ends of the support sheathing so that the inner circumferential walls thereof are in pressing contact with the outsides of the projecting sheathing ends and the star discs are pressed against the end faces of the hollow stick. Then the projecting sheathing ends are inverted over the star discs toward the outside circumference back through 180°, while simultaneously stretching the inverted ends in the direction of the longitudinal axis and causing points of the star discs positively to engage grid openings of the inverted ends.

In the following, the manufacture of a functional unit according to the invention using the elements described above, is explained in detail.

A hollow stick or rod, for example made up of a longitudinally shirred tube of fiber-reinforced cellulose hydrate, is arranged inside of the hollow space of the tubular grid-like structured sheathing, for example, comprised of polyethylene, in such a way that sheathing ends of equal length protrude over the ends of the hollow stick.

Then star discs, for example, made of polyvinyl chloride, and which may, for example, have 24 points symmetrically arranged with respect to each other, are slid over the projecting sheathing ends which extend in the direction of the longitudinal axis and are pushed toward the hollow stick and pressed against the ends thereof.

Due to the dimensioning of the central circular openings of the star discs and also due to the outside diameter of the support sheathing, the areas of the projecting sheathing ends which are adjacent to the circumferential walls of the circular openings in the star discs are correspondingly radially constricted. In the end areas adjacent to the outer circumference of the support sheathing, the projecting ends of the support sheathing are pressed against the end faces of the hollow stick by one of the star disc surfaces. Under conditions in which the pressure exerted by the star discs is maintained, for example, with the aid of suitable die elements which fix the position of the star discs with respect to the hollow rod, the projecting sheathing ends are then turned outwardly over the star discs and back through 180°. At the same time, the inverted ends are stretched in the direction of the longitudinal axis and points of the star discs are caused to positively engage grid openings of the inverted ends of the support sheathing. Once this positive engagement has been produced, the stretching force acting upon the projecting sheathing ends is released.

The longitudinal stretching of the projecting support sheathing ends which have been inverted toward the outside and back through 180° may, for example, be effected by seizing their ends with plyer-shaped tools, by means of which a traction force is exerted upon the projecting ends in the direction of the longitudinal axis so that the ends are stretched.

Below, the invention is explained by reference to the accompanying drawings. Referring to the drawings, in FIG. 1 the reference numeral 1 denotes the functional unit as a whole. The hollow stick 2 made up of a longitudinally shirred packaging tube has a cavity 3 with two terminal cavity openings 4, which define the end faces 5 of the hollow stick. A supporting container 6 (as a whole) envelops the hollow rod leaving its cavity opening free. A grid-like structured piece of tubular sheathing 7 (FIG. 2) forms the supporting container, which has a projecting sheathing end 8 inverted toward the outside and turned back through 180°. A star disc 9 is encompassed by the inverted end 8, and the points 10 (FIG. 3) of the star disc positively engage the grid openings 11 (FIG. 2) of the inverted end. The end of the inverted sheathing 12 lies against the outer circumference of the supporting container. The limiting edge of the central circular opening of the star disc is designated by reference numeral 13.

What is claimed is:

1. A functional unit, comprising:
   a longitudinal shirred packaging tube; and
   a supporting sheath surrounding said shirred packaging tube, said supporting sheath comprising:
   a generally tubular shaped supporting sheath comprised of a grid-like structure and having an inside diameter slightly larger than the outside diameter of said shirred packaging tube and a length substantially greater than the length of said shirred packaging tube, so that when said shirred packaging tube is placed inside of said supporting sheath, two protruding ends of said supporting sheath remain;
   a generally planar star-like disc element on each of said protruding ends of said supporting sheath, each of said disc elements including a central aperture therein and a plurality of point-like projections spaced around its outer circumference, each of said disc elements having an outer diameter defined by the ends of said point-like protrusions which is larger than the inside diameter of said supporting sheath;
   a first of said star-like disc elements being slid with its aperture over one of the protruding ends of said supporting sheath and abutted against a first end of a shirred packaging tube contained in said supporting sheath and engaging with its point-like protrusions the grid openings of said supporting sheath when said sheath is folded back 180° upon itself forming a first turned-back end; and
   a second of said star-like disc elements being slid with its aperture over the other of the protruding ends of said supporting sheath and abutted against the second end of a shirred packaging tube contained in said supporting sheath and engaging with its point-like protrusions the grid openings of said supporting sheath when said sheath is folded back 180° upon itself forming a second turned-back protruding end.

2. A functional unit as claimed in claim 1, wherein said supporting sheath having a grid-like structure is comprised of a thermoplastic synthetic resinous material.

3. A functional unit as claimed in claim 2, wherein said synthetic resinous material comprises polyethylene.

4. A functional unit as claimed in claim 1, wherein said star-like disc elements comprise a thermoplastic synthetic resinous material.

5. A functional unit as claimed in claim 4, wherein said synthetic resinous material comprises polyvinyl chloride.

6. A functional unit as claimed in claim 1, wherein each of said star-like disc elements comprises a round central portion and at least three of said point-like protrusions uniformly spaced about its circumference.

7. A functional unit as claimed in claim 1, wherein said shirred packaging tube comprises fiber-reinforced cellulose hydrate.

* * * * *